(12) United States Patent
Hoogerhyde

(10) Patent No.: US 8,058,755 B2
(45) Date of Patent: Nov. 15, 2011

(54) RECIPROCATING DUAL-ACTION PISTON MAGNETIC FORCE MOTOR AND METHOD

(75) Inventor: Calvin A. Hoogerhyde, Alba, MI (US)

(73) Assignee: Hoogerhyde Motor, LLC, Alba, MI (US)

( * ) Notice: Subject to any disclaimer, the term of this patent is extended or adjusted under 35 U.S.C. 154(b) by 168 days.

(21) Appl. No.: 12/504,852

(22) Filed: Jul. 17, 2009

(65) Prior Publication Data

US 2010/0156202 A1 Jun. 24, 2010

Related U.S. Application Data

(60) Provisional application No. 61/138,718, filed on Dec. 18, 2008.

(51) Int. Cl.
*H02K 7/00* (2006.01)
*H02K 7/06* (2006.01)
*H02K 33/00* (2006.01)
*H02K 35/00* (2006.01)

(52) U.S. Cl. ......... 310/17; 310/15; 310/16; 310/20; 310/23; 310/24; 310/35

(58) Field of Classification Search ......... 310/15–35; H02K 7/00, 7/06, 33/00, 35/00
See application file for complete search history.

(56) References Cited

U.S. PATENT DOCUMENTS

| | | | | |
|---|---|---|---|---|
| 3,575,649 A | * | 4/1971 | Mathews | 318/127 |
| 4,359,673 A | * | 11/1982 | Bross et al. | 318/38 |
| 4,404,503 A | * | 9/1983 | Ward et al. | 318/119 |
| 4,507,579 A | | 3/1985 | Turner | |
| 5,036,930 A | * | 8/1991 | Bisel et al. | 180/65.1 |
| 5,203,172 A | | 4/1993 | Simpson et al. | |
| 5,757,093 A | | 5/1998 | Susliaev et al. | |
| 6,929,245 B2 | * | 8/2005 | McCarty et al. | 251/344 |
| 7,446,440 B2 | | 11/2008 | Mihajlovic | |
| 2010/0156202 A1 | * | 6/2010 | Hoogerhyde | 310/20 |

FOREIGN PATENT DOCUMENTS

| | | |
|---|---|---|
| JP | 2004-056988 A | 2/2004 |
| KR | 2000-0001108 A | 1/2000 |

OTHER PUBLICATIONS

Communication from the Korean Intellectual Property Office (Jun. 1, 2010).

* cited by examiner

*Primary Examiner* — Quyen Leung
*Assistant Examiner* — John K Kim
(74) *Attorney, Agent, or Firm* — Price Heneveld LLP

(57) ABSTRACT

A motor system and method thereof are provided, wherein the system includes an energy storage device, a piston assembly including a magnet, at least two end assemblies in operable communication with the piston assembly, and includes first and second end assemblies, each having an electromagnet. The motor system further includes a controller that controls a supply of electrical power to first and second electromagnets of the first and second end assemblies, such that a first polarity of the first electromagnet is opposite a second polarity of the second electromagnet, and the first and second polarities are intermittingly altered by the supply of electrical power, so the magnet of the piston assembly is attracted and repelled from the first and second end assemblies.

6 Claims, 11 Drawing Sheets

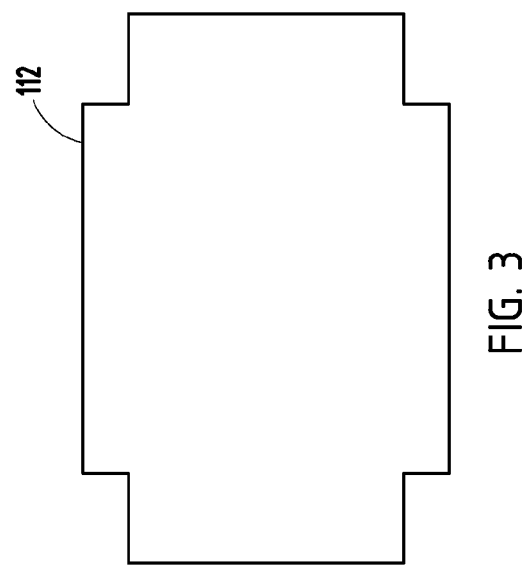
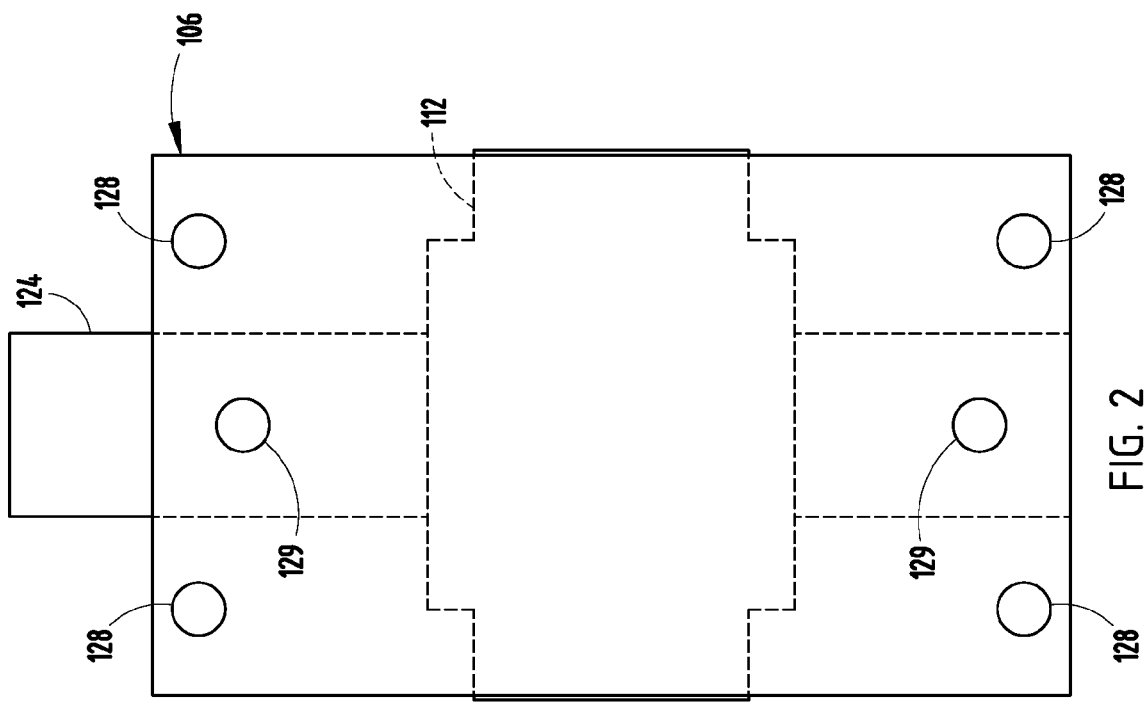

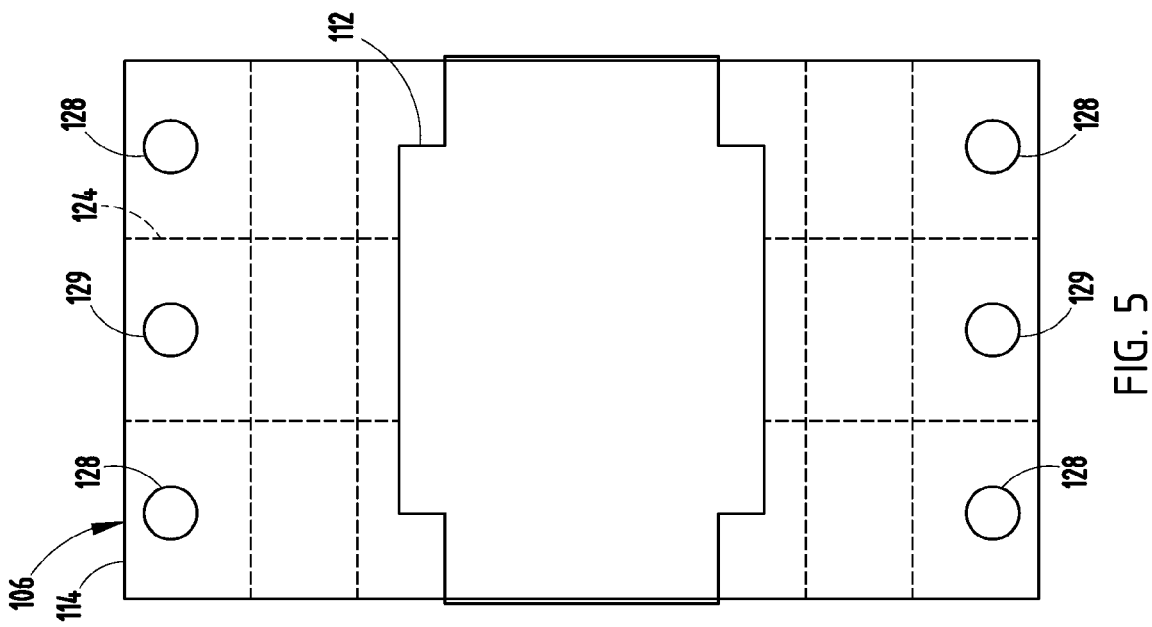
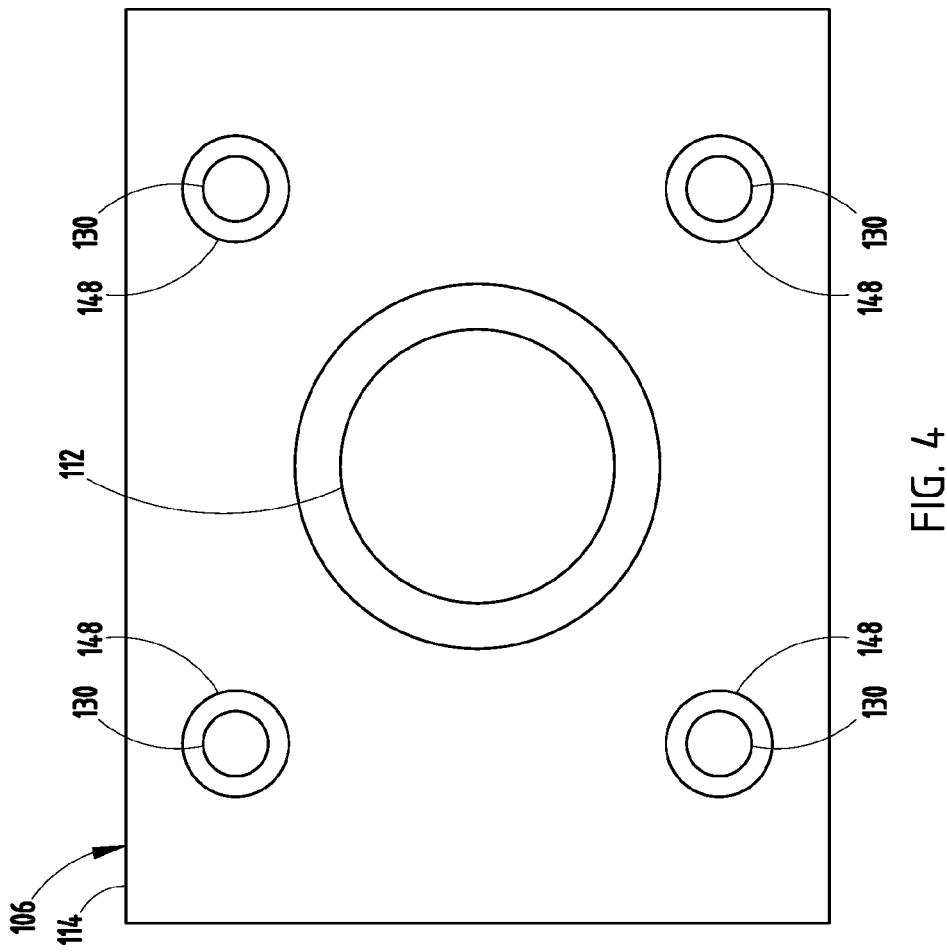

RECIPROCATING DUAL-ACTION PISTON MAGNETIC FORCE MOTOR AND METHOD

CROSS-REFERENCE TO RELATED APPLICATION

This application claims benefit under 35 U.S.C. §119(e) to U.S. Provisional Patent Application No. 61/138,718, entitled "RECIPROCATING DUAL-ACTION PISTON MAGNETIC FORCE MOTOR AND METHOD," filed on Dec. 18, 2008, the entire disclosure of which is hereby incorporated herein by reference.

FIELD OF THE INVENTION

The present invention generally relates to a reciprocating piston motor and method for producing work as an output, and more particularly, relates to a motor operated by alternating magnetic fields and a method thereof.

BACKGROUND OF THE INVENTION

Generally, there have been attempts to build a motor, wherein a reciprocating piston is moved by various types of magnets placed at various locations on and around the piston. Typically, these attempts resulted in a motor not having enough torque and excess energy output to replace an internal combustion. One exemplary motor is described in U.S. Pat. No. 7,446,440, which uses permanent magnets arranged in rows on the piston and on sliding field plate(s) located at one or both ends of a cylinder. The motor operates by sliding the field plate(s) from a position whereby its magnets attract the magnets located on the piston, to a position whereby its magnets repel the magnets on the piston.

Another exemplary device is disclosed in U.S. Pat. No. 4,507,579, which teaches a reciprocating piston electric motor that uses coils wrapped around each end of a cylinder to create electromagnets. The motor uses a piston made of a permanent magnet with one end being positive and the other end being negative, wherein electricity is applied to the coils in alternating fashion as to reverse the magnetic fields produced which causes the piston to move. Generally, a reciprocating piston motor requires a power source that creates enough force that generates sufficient torque for a given application. Automobiles and electrical generators require an adequate amount of torque, and therefore, most motors for these applications typically use the explosive power of fossil fuels. Generally, an internal combustion engine uses a relatively small amount of electricity to cause the fossil fuel to explode, thereby creating mechanical energy. Essentially, the fossil fuel is used to greatly magnify the energy potential of the electricity applied, and because the energy in the fossil fuel is exhausted in the process, the operational cost for fuel are perpetual, and the process may have adverse affects on the environment.

SUMMARY OF THE INVENTION

According to one aspect of the present invention, a motor system includes an energy storage device, a piston assembly including a magnet, at least two end assemblies, wherein the piston assembly is configured to move with respect to the at least two end assemblies, the at least two end assemblies including a first end assembly, and a second end assembly on an opposite side of the piston assembly of the first end assembly, each of the first and second end assemblies having an electromagnet in electrical communication with the energy storage device. The motor system further includes a controller in electrical communication with the energy storage device and the at least two end assemblies, wherein the controller is configured to control a supply of electrical power to first and second electromagnets of the first and second end assemblies, such that a first polarity of the first electromagnet is opposite a second polarity of the second electromagnet, and the first and second polarities are intermittingly altered by the supply of electrical power, so the magnet of the piston assembly is attracted and repelled from the first and second end assemblies.

According to another aspect of the present invention, a motor system includes an energy storage device, and a piston assembly including a neodymium magnet and a piston assembly housing enclosing at least a portion of the neodymium magnet. Additionally, the motor system includes at least two end assemblies, wherein the piston assembly is configured to move with respect to the at least two end assemblies, the at least two end assemblies including a first end assembly and a second end assembly on an opposite side of the piston assembly of the first end assembly, each of the first and second end assemblies including an electromagnet in electrical communication with the energy storage device, and an end assembly housing enclosing at least a portion of the electromagnet. The motor system further includes at least one support rod extending between and connecting the first end assembly and the second end assembly, wherein the at least one support rod extends through the piston assembly, a crankshaft operably connected with the piston assembly, a connecting rod extending from the piston assembly housing and operably connected to the crankshaft, and a crankshaft connector, wherein the crankshaft connector is operably connected to the crankshaft and the connecting rod to operably connect the crankshaft to the piston assembly. The motor system also includes a controller in electrical communication with the energy storage device and the at least two end assemblies, wherein the controller is configured to control a supply of electrical power to the first and second electromagnets of the first and second end assemblies, such that a first polarity of the first electromagnet is opposite a second polarity of the second electromagnet, and the first and second polarities are intermittingly altered by the supply of electrical power, so the magnet of the piston assembly is attracted and repelled from the first and second end assemblies.

According to yet another embodiment of the present invention, a method of producing work as an output includes the steps of creating a first polarity of a first electromagnet, creating a second polarity of a second electromagnet, attracting a magnet towards the first electromagnet, repelling the magnet away from the second electromagnet, altering the first and second polarities, repelling the magnet away from the first electromagnet, attracting the magnet towards second electromagnet, and producing work as an output based upon the attracting and repelling of the magnet.

These and other features, advantages, and objects of the present invention will be further understood and appreciated by those skilled in the art by reference to the following specification, claims, and appended drawings.

BRIEF DESCRIPTION OF THE DRAWINGS

FIG. 2 is a top view of a piston assembly, in accordance with one embodiment of the present invention;

FIG. 3 is a top view of a magnet of a piston assembly, in accordance with one embodiment of the present invention;

FIG. 4 is a side view of a piston assembly, in accordance with one embodiment of the present invention;

FIG. 5 is a cross-sectional view of a piston assembly, in accordance with one embodiment of the present invention;

DETAILED DESCRIPTION

Figure 1:
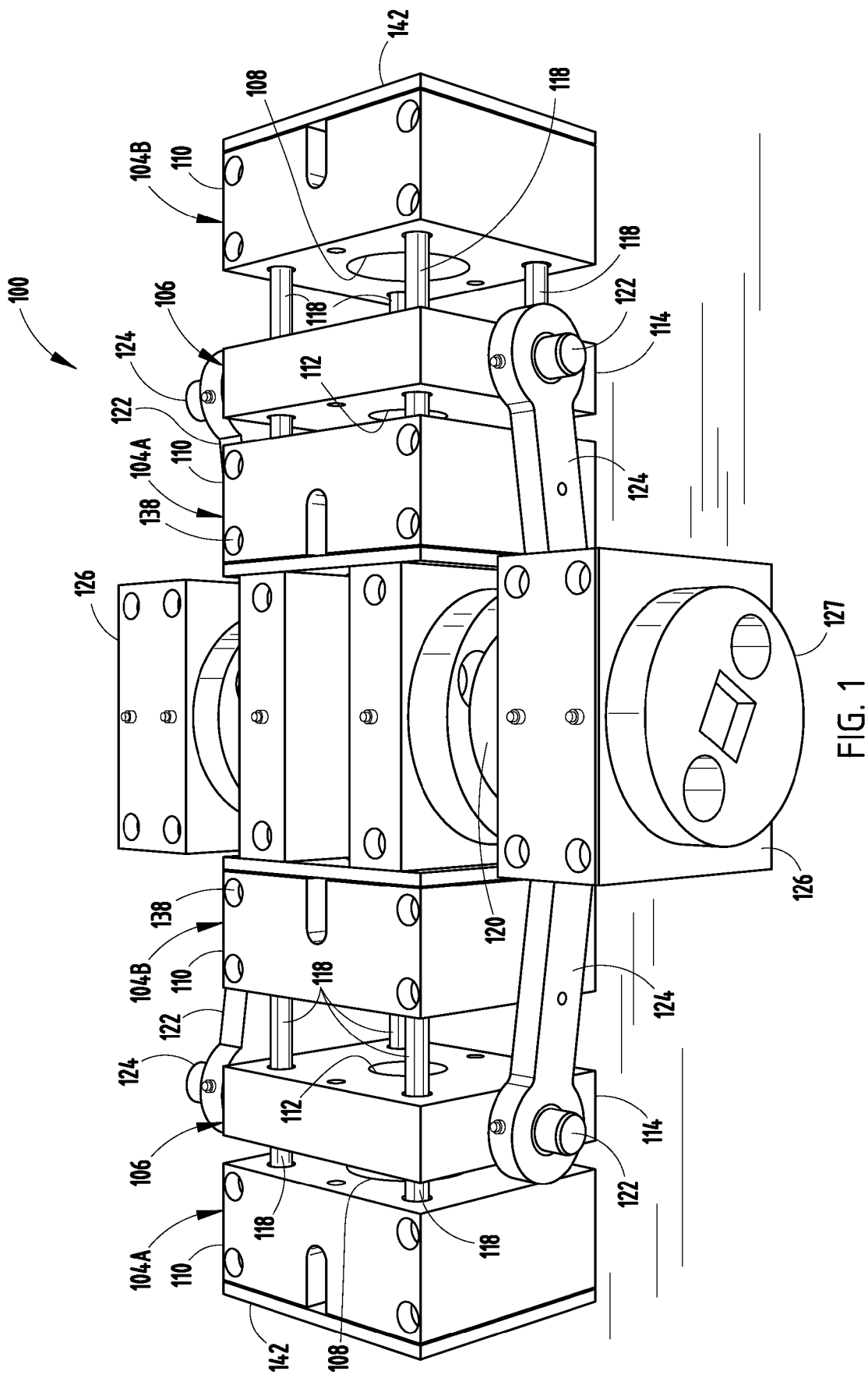
FIG. 1 is a top-front perspective view of a motor system, in accordance with one embodiment of the present invention.

Before describing in detail embodiments that are in accordance with the present invention, it should be observed that the embodiments reside primarily in a motor system and method of providing work as an output. Accordingly, the system and method have been represented, where appropriate, by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms, such as first and second, top and bottom, and the like, may be used to distinguish one entity or action from another entity or action, without necessarily requiring or implying any actual such relationship or order between such entities or actions. The terms "comprises," "comprising,' or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

In regards to exemplary embodiments illustrated in FIGS. 1, 12, 15, and 17, a motor system is generally shown at reference identifier 100. The motor system 100 can include an energy storage device 102 (FIG. 15), and at least two end assemblies 104. Typically, the at least two end assemblies 104 include a first end assembly, generally indicated at 104A, and a second end assembly, generally indicated at 104B, on an opposite side of a piston assembly, generally indicated at 106, as the first end assembly 104. By way of explanation and not limitation, the motor system 100 is illustrated in FIG. 1 as including two sets of corresponding end assemblies 104A, 104B and two piston assemblies 106; however, the motor system 100 can include one or more sets of corresponding end assemblies 104 and piston assemblies 106.

Figure 7:
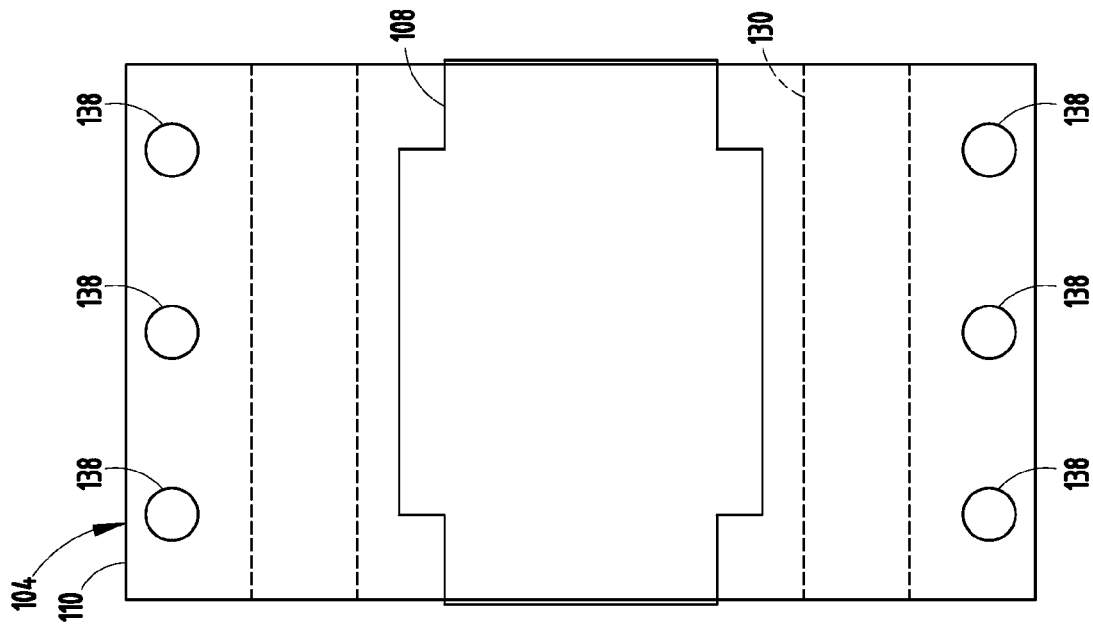
FIG. 7 is a cross-sectional top view of an end assembly, in accordance with one embodiment of the present invention.
Figure 6:
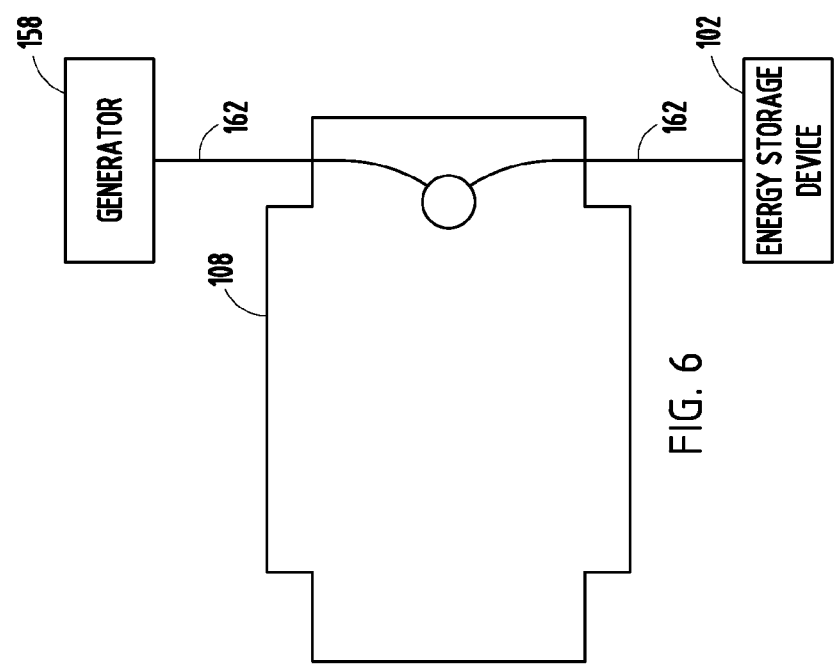
FIG. 6 is a top view of an electromagnet of an end assembly, in accordance with one embodiment of the present invention.

Each of the first end assembly 104A and second end assembly 104B include an electromagnet 108, and can further include an end assembly housing 110 enclosing at least a portion of the electromagnet 108 (FIGS. 6 and 7). The piston assembly 106 includes a magnet 112, and can further include a piston assembly housing 114 enclosing at least a portion of the magnet 112 (FIGS. 2-5, and 10). The motor system 100 further includes a controller 116 in communication with the energy storage device 102 and the first and second end assemblies 104A, 104B. The controller 116 is configured to control a supply of electrical power to the first and second electromagnets 108 of the first and second end assemblies 104A, 104B, respectively. Thus, the first polarity of the first electromagnet 108 is, at least during a portion of a time of the motor system 100 operating, opposite a second polarity of the second electromagnet 108, and a first and second polarities are intermittently altered by the supply of electrical power, so that the magnet 112 of the piston assembly 106 is attracted and repelled from the first and second end assemblies 104A, 104B, respectively, as described in greater detail herein.

Thus, the motor system 100 alters the polarity of the electromagnets 108 of the end assemblies 104 by supplying and altering the supply of electrical power to the electromagnets 108 from the energy storage device 102. Such a change in polarity of the electromagnets 108 causes the piston assembly 106 to move between the end assemblies 104 as the electromagnets 108 continuously change from attracting to repelling and repelling to attracting the magnet 112 of the piston assembly 106. The motor system 100 can be a reciprocating motor that utilizes electromagnets 108 with reversible polarity, such that the magnetic fields generated interact with a positive magnetic field generated on each end of the magnet 112 embedded in the piston assembly 106 that can force the piston assembly 106 to move.

According to one embodiment, the magnet 112 of the piston assembly 106 is a rare Earth magnet. For purposes of explanation and not limitation, the magnet 112 of the piston assembly 106 can be a neodymium magnet. The magnet 112 of the piston assembly 106 can have the same positive polarity on a first end that is directed towards the first electromagnet 108, and a second end that is directed towards the second electromagnet 108.

The motor system 100 can further include at least one support rod 118 extending between and connecting the first end assembly 104A and the second end assembly 104B, wherein the support rod 118 extends through the piston assembly 106, according to one embodiment. Thus, as the piston assembly 106 is attracted and repelled by the first and second end assemblies 104A, 104B, the piston assembly's 106 directional movement can be a function of a shape of the support rod 118.

The motor system 100 can also include a crankshaft 120 in operable communication or operably connected with the piston assembly 106, according to one embodiment. A rotational movement of the crankshaft 120 can be a function of movement of the piston assembly 106, as the piston assembly 106 is being attracted and repelled between the first and second end assemblies 104A, 104B. Additionally, the motor system 100 can include at least one connecting rod 124 extending from the piston assembly housing 114 to the crankshaft 120. A connecting rod pin 122 can be operably connected to the crankshaft 120 and the connecting rod 124 to operably connect the crankshaft 120 to the piston assembly 106. A crankshaft support housing 126 can enclose at least a portion of the crankshaft 120. Additionally, a crankshaft connector 127 can be used to operably connect multiple crankshafts 120 to one another, connect one more crankshafts 120 to the crankshaft support housing, or a combination thereof.

The crankshaft connector 127 can also be used to operably connect the connecting rod 124 to the crankshaft 120 by using the same or similar connecting rod pin 122, which can be used to operably connect the connecting rod 124 to the piston assembly 106, according to one embodiment. In such an embodiment, the connecting rod pins 122 can be inserted into the crankshaft connector 127 approximately one hundred eighty degrees (180°) apart to provide rotation of the crankshaft 120.

According to one embodiment, the controller 116 can be configured to control the supply of electrical power from the energy storage device 102 to the electromagnet 108 of the first end assembly 104A to attract the magnet 112 of the piston assembly 106. The controller 116 can then alter the electrical power supplied to the electromagnet 108 of the first end assembly 104A when the piston assembly 106 is a predetermined distance away from the first end assembly 104A, such that the first polarity is neutralized. According to one embodiment, the predetermined distance is approximately twenty degrees (20°) from the end of the piston assembly 106 stroke. The controller 116 can then alter the electrical power supply from the energy storage device to the electromagnet 108 of the first end assembly 104A to change the polarity of the electromagnet 108 to repel the magnet 112 of the piston assembly 106. Typically, as a force between two (2) magnets is greater when they come in closer proximity to each other, the motor system 100 can cause the magnet 112 in the piston assembly 106 to come to approximately a thirty-secondth of an inch (1/32 in) from the electromagnets 108 in the end assemblies 104 for production of enhanced torque.

Figure 16:
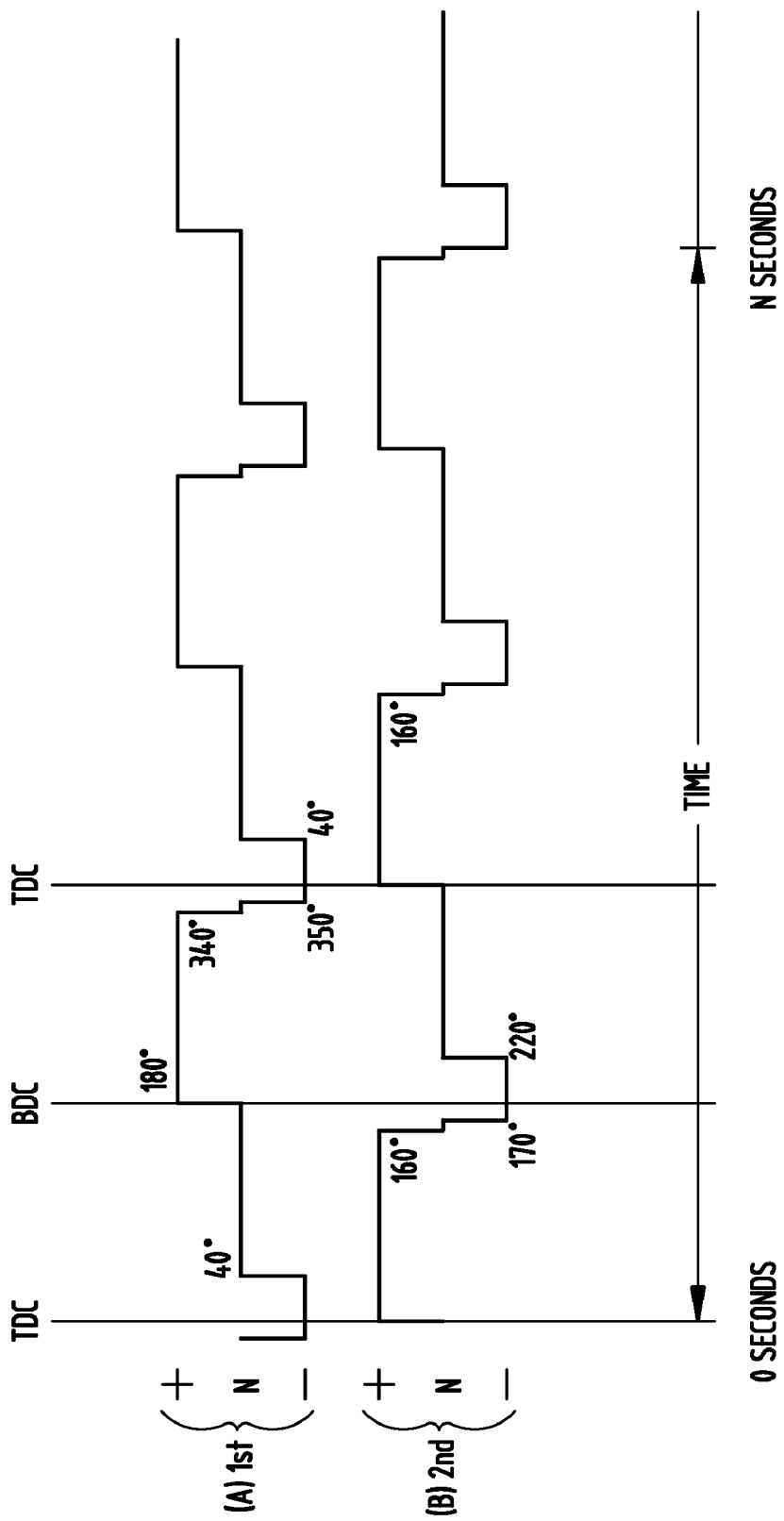
FIG. 16 is a timing diagram illustrating an altering of polarities of electromagnets of end assemblies, in accordance with one embodiment of the present invention.

With respect to FIG. 16, an exemplary timing diagram illustrates altering a polarity of the electromagnets 108 of the first and second end assemblies 104A, 104B, according to one embodiment. It should be appreciated by those skilled in the art that similar timing diagrams may be utilized for operating the motor system 100 having at least a portion of different angles/timing as that illustrated in FIG. 16 and described below. The controller 116 can control a supply of electrical power from the energy storage device 102 to create a first polarity (e.g., a positive polarity) of the electromagnet 108 of the first end assembly 104A, while controlling a supply of electrical power from the energy storage device 102 to create a second polarity (e.g., a negative polarity) of the electromagnet 108 of the second end assembly 104B. Thus, the magnet 112 of the piston assembly 106 is being attracted by the electromagnet 108 of the first end assembly 104A, while being repelled by the electromagnet 108 of the second end assembly 104B.

At a time when the piston assembly 106 is a predetermined distance away from the first end assembly 104A, such as, but not limited to, approximately twenty degrees (20°), the controller 116 can control the supply of electrical power to neutralize the polarity of the electromagnets 108 of both the first and second end assemblies 104A, 104B. The controller 116 can then control the supply of electrical power, such that the electromagnet 108 of the first end assembly 104A repels (e.g., a negative polarity) the magnet 112 of the piston assembly 106, and the electromagnet 108 of the second end assembly 104B attracts (e.g., a positive polarity) the magnet 112 of the piston assembly 106. This pattern can continue to repeat, wherein electromagnets 108 of the first and second end assemblies 104A, 104B are neutralized when altering the polarity.

The operation of the motor system 100 can be controlled by the controller 116, such as, but not limited to, an electronic switching mechanism designed to substantially simultaneously energize each electromagnet 108 in the proper sequence, according to one embodiment. The electromagnets 108 can be energized in sequence so as to provide reciprocation of the piston assembly 106, and to provide increased torque to the crankshaft 120. Increased torque can be produced by allowing sufficient time (e.g., approximately two hundred milliseconds (200 ms)) for each electromagnet 108 to completely form its "attract" magnetic field. As such, the timing can have the controller 116 energizing the "attract" mode of a given electromagnet 108, while the piston assembly 106 is more than approximately two hundred milliseconds (200 ms) away (e.g., during stroke) from the electromagnet 108. This allows the electromagnet 108 time for approximately the full magnetic force to develop which enhances the torque created by the motor system 100. Near the same point in the time that a given electromagnet 108 can be energized to attract, its opposing corresponding electromagnet 108 can be switched from "repel" to "off," so that its magnetic field cannot interfere with the formation of the magnetic fields at the other end of the piston assembly 106.

As the piston assembly 106 approaches the electromagnet 108 which has been in "attract" mode, that electromagnet 108 is switched off briefly, and then switched to repel slightly before the piston assembly 106 reaches the end of its stroke. The electromagnet 108 then remains in "repel" mode until the piston assembly 106 reverses direction and begins to travel toward the opposing electromagnet 108 thereby starting the cycle over. The power unit within the controller 116 can be capable of dissipating the resulting energy from rapid switching of the electromagnet 108.

Typically, such switching can create a "J" pattern from each electromagnet 108 as it relates to the stroke of the piston assembly 106. It should be appreciated by those skilled in the art that the timing can be altered to result in other suitable patterns that may be more or less efficient. At the top of the "J" the piston is moving toward a given electromagnet 108, which is in "attract" mode. As the piston assembly 106 draws close to that electromagnet 108 it is switched off, prior to the curve of the "J," and then switched to "repel" throughout the bottom curve of the "J." Once the piston assembly 106 completes it stroke and is traveling the opposite direction, as it reaches the end of the "J," it is switched off and left off until the piston assembly 106 completes its stroke in that direction and returns to the top of the "J." Each corresponding electromagnet 108 can be timed to create overlapping "J's" in the opposite direction so as to complete one cycle, which can be represented as a three hundred sixty degree (360°) circle, wherein this circle can represent one (1) revolution of the crankshaft 120.

The piston assembly 106 against a given electromagnet 108 can be considered to be top-dead center (TDC) which is approximately equal to zero degrees (0°) or three hundred sixty degrees (360°). The piston assembly 106 approximately between the two electromagnets 108 is at ninety degrees (90°) as it moves away from the TDC. Upon reaching bottom-dead center (BDC) the piston assembly 106 can be at approximately one hundred eighty degrees (180°), and when halfway between electromagnets 108 again during its return stroke, it is at approximately two hundred seventy degrees (270°). Upon returning to TDC the piston assembly can be substantially at approximately three hundred sixty degrees (360°) or zero degrees (0°).

The timing mechanism (e.g., the controller 116) at TDC or zero degrees (0°) can have the electromagnet 108 located at TDC switched to "repel" (e.g., bottom of "J"), and the opposite corresponding electromagnet 108 switched to "attract" (e.g., top of "J"). As the piston assembly 106 reaches approximately forty degrees (40°) the electromagnet 108 at TDC is switched off (e.g., end of "J"), and the electromagnet 108 at BDC is kept in "attract" mode until approximately one hundred sixty degrees (160°) when it is switched to "off" until approximately one hundred seventy degrees (170°), when it is switched to "repel," and continues in "repel," until approximately two hundred twenty degrees (220°) (e.g., end of "J"). When the piston assembly 106 can be at BDC or approximately one hundred eighty degrees (180°), the opposite corresponding electromagnets 108 can be switched to "attract" (e.g., top of "J"), starting the cycle over again. It should be appreciated by those skilled in the art that the above-noted exemplary degree settings can be altered to increase or reduce torque to the crankshaft 120. This exemplary embodiment can be illustrated in the following table:

TABLE 1

|  |  | Electromagnets A&C |  | Electromagnets B&D |  |
|---|---|---|---|---|---|
| TDC: | 0° (360°) | Repel | (n/a) | Attract | (s) |
|  | 40° | Off | (s) | Attract | (n/a) |
|  | 160° | Off | (n/a) | Off | (s) |
|  | 170° | Off | (n/a) | Repel | (s) |
| BDC: | 180° | Attract | (s) | Repel | (n/a) |
|  | 220° | Attract | (n/a) | Off | (s) |
|  | 340° | Off | (s) | Off | (n/a) |
|  | 350° | Repel | (s) | Off | (n/a) |

*n/a = no action
(s) = switching

Electromagnets A & C can be included in the first end assemblies 104A and Electromagnets B&D can be included in the corresponding second end assemblies 104B, respectively, in an embodiment wherein the motor system 100 includes multiple corresponding end assemblies 104 and piston assemblies 106 (e.g., the motor system 100 is two (2) or multi-cylinder system). Typically, the controller 116 (e.g., a switching mechanism) can independently control the two corresponding electromagnets 108.

In an embodiment wherein the TDC is when the piston assembly 106 is against the electromagnet 108 of the first end assembly 104A (e.g., Electromagnet A), the switching of each Electromagnets A&C can occur approximately as shown in Table 2 below:

TABLE 2

| Electromagnets A&C | Electromagnets B&D |
|---|---|
| Switch to Attract 180° | 0° (360°) |
| Switch to Off 340° | 160° |
| Switch to Repel 350° | 170° |
| Switch to Off 40° | 220° |

The same settings can be used for the corresponding Electromagnets C&D in another part of the motor system 100, typically on the opposite side of the crankshaft 120 (FIG. 1). As such, the controller 116 (e.g., a switching mechanism) can send similar signals to Electromagnets A&C, and similar signals to Electromagnets B&D.

According to one embodiment, the controller 116 (e.g., a switching mechanism) can be configured so that an operator can alter these exemplary settings, so that the motor system 100 can be tuned for increased efficiency. Typically, sufficient time for each electromagnet's 108 field to substantially fully form can be allowed. As it can take approximately two hundred milliseconds (200 ms) for a field to substantially fully develop, proper timing of the polarity switching to achieve increased torque can be a function of the length of the stroke of the piston assembly 106 and the motor system's 100 speed or revolutions per minute (RPMs).

Assuming an approximate four inch (4 in) stroke, then inserting various RPM rates, can allow for the creation of a power graph indicating the RPM range to achieve approximately one hundred percent (100%) efficiency from the electromagnets 108. Once the proper RPM of the motor system 100 is determined, the controller 116 (e.g., a switching mechanism) can be able to be set to operate the motor system 100 at the desired speed.

Using the above exemplary equations, a desired speed of approximately one hundred twenty (120) RPMs when using a four inch (4 in) stroke can be utilized. Operating the motor system 100 at higher RPMs can reduce torque because the magnetic fields will not have an adequate amount of time to substantially fully form their magnetic fields. One exemplary embodiment of the motor system 100 operates at two hundred forty (240) RPMs.

The controller 116 (e.g., electronic switching mechanism) can be comprised of a transducer, a central processing unit, resolvers, solid-state relays connected to each electromagnet 108, other adequate electrical, mechanical, or electromechanical components, the like, or a combination thereof, according to one embodiment. The transducer can be attached directly to the crankshaft 120 with zero degrees (0°) or three hundred sixty degrees (360°) being the reading if the piston assembly 106 is towards the first end assembly 104A (e.g., to the far left of FIG. 1), at the top of its stroke, being TDC. The transducer can transmit the location of the piston assembly 106 to the controller (e.g., a central processing unit) in degrees corresponding to the three hundred sixty degree (360°) cycle of the piston assembly 106 from the TDC back to the TDC. The controller 116 (e.g., a central processing unit ) can be configured to cause the adequate sequencing of the electromagnets 108, and control a power unit, resolvers, and solid-state relays to appropriately energize the electromagnets 108 resulting in the desired sequencing necessary to achieve increased torque and efficiency.

According to an alternate embodiment, the controller 116 (e.g., electronic switching mechanism) can include a resolver or encoder that monitors a radial position of the crankshaft 120, speed of the crankshaft 120 in RPM, or a combination thereof, and a central processing unit that controls the ON/OFF sequence of the various outputs. In addition to the controller 116, the motor system 100 can utilize an individual power unit, consisting of solid state relays (SSR) with heat sinks, power diodes with heat sinks, transient voltage suppression devices, power dissipation devices, the like, or a combination thereof. The power unit transfers the twenty four volts direct current (24 VDC) power to the correct electromagnets 108 based on an output firing sequence from the controller 116. Outputs from the controller 116 can fire individual solid state relays in the power unit. When the various SSR's are turned ON they pass voltage to their respective electromagnets 108 in a certain polarity, which in turn changes the electromagnet 108 performance to either attract or repel. The resolver or encoder translates the crankshaft 120 position to a radial reading between approximately zero degrees (0°) and approximately three hundred fifty-nine degrees (359°). The controller 116 offers the flexibility of setting the Zero Point of the crankshaft 120 rotation at any point within the three hundred sixty degrees (360°) of rotation. This setting can be entered by the operator and can be used to enhance the motor system 100 performance. Typically, all ON/OFF transition points for all outputs can be referenced from this Zero Point. In addition to setting the Zero Point of the crankshaft 120 position, the entire crankshaft 120 position can be electronically shifted in the positive (Advance) or negative (Retard) directions. Advancing or Retarding the timing can shift the Zero Point and all ON/OFF transition accordingly.

Figure 12:
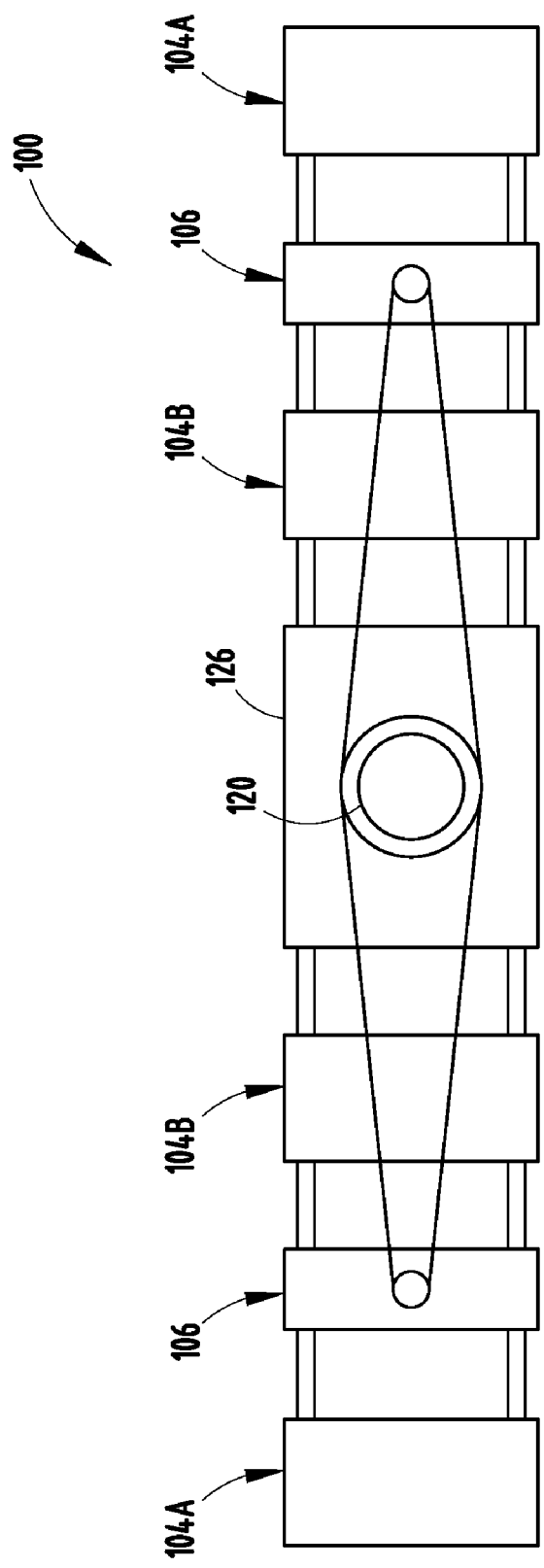
FIG. 12 is a side view of a motor assembly, in accordance with one embodiment of the present invention.
Figure 15:
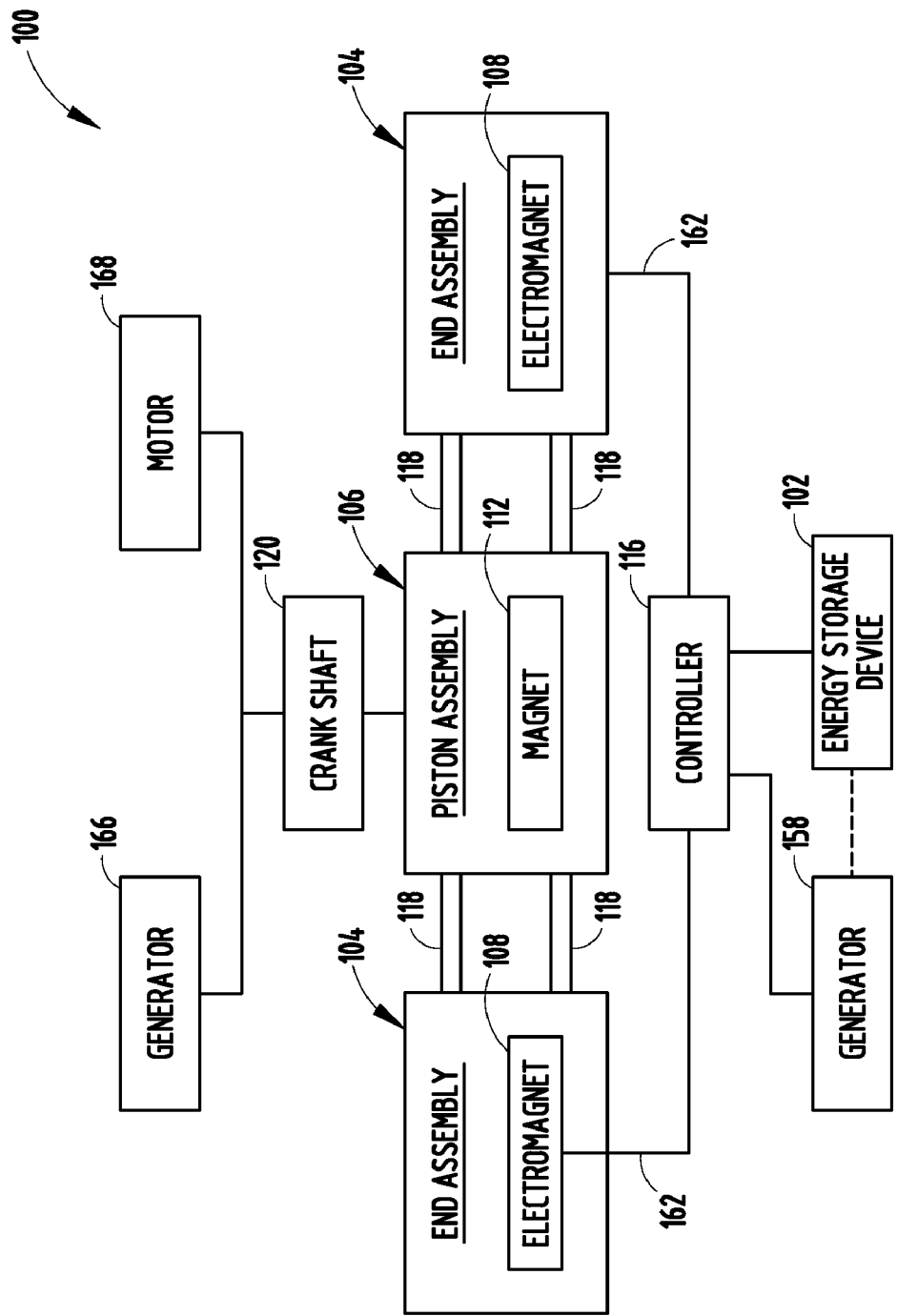
FIG. 15 is a block diagram illustrating a motor system, in accordance with one embodiment of the present invention.

According to one embodiment, with respect to FIGS. 1, 12, and 15, the piston assembly 106 can include the magnet 112, which can be formed by one or more pieces and made of neodymium, iron, boron, the like, or a combination thereof. The exemplary embodiment illustrated in FIG. 1 includes the piston assembly 106 having a one piece piston assembly housing 114, and the exemplary embodiments illustrated in FIGS. 2, 4, and 5 include the piston assembly 106 having a multiple piece piston assembly housing 114. Typically, as shown in an exemplary embodiment illustrated in FIGS. 2-5, when the magnet 112 is an approximately four inch by six inch (4 in×6 in) round magnet with an approximately one inch by one-half inch (1 in×½ in) notch cut from each outer edge to secure the magnet 112. Alternatively, with respect to an exemplary embodiment illustrated in FIG. 1, the magnet 112 may not be notched, and the magnet 112 can be epoxied into the piston assembly housing 114. In such an embodiment, the magnet 112 can be secured by, but not limited to, an epoxy, other suitable adhesive, the like, or a combination thereof. Additionally or alternatively, the magnet 112 can have an exposed magnetic surface of approximately three inches (3 in) on each side of the piston assembly housing 114 (FIG. 3). The magnet 112 can have the same polarity (e.g., positive polarity) on each of its exposed ends, so that the magnetic fields will emanate outward in both directions from the approximately three inch (3 in) ends of the round magnet. Typically, each field will attract or have a pulling power estimated to be approximately nine hundred pounds (900 lbs).

Figure 18A:
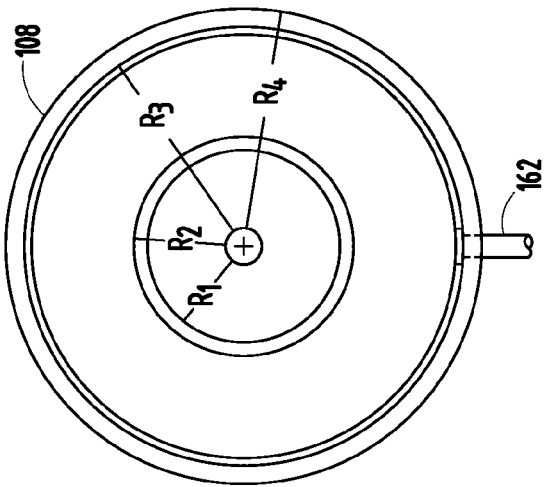
FIG. 18A is a front plan view of an electromagnet, in accordance with one embodiment of the present invention.
Figure 18B:
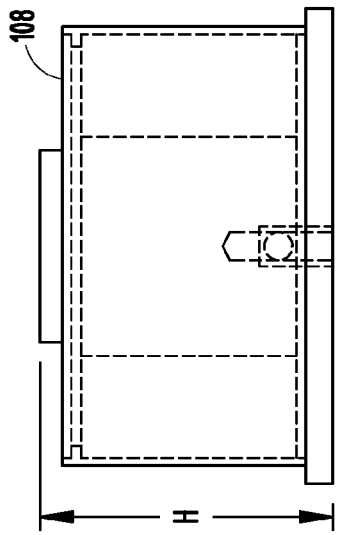
FIG. 18B is a side view of the electromagnet of FIG. 18A.
Figure 17:
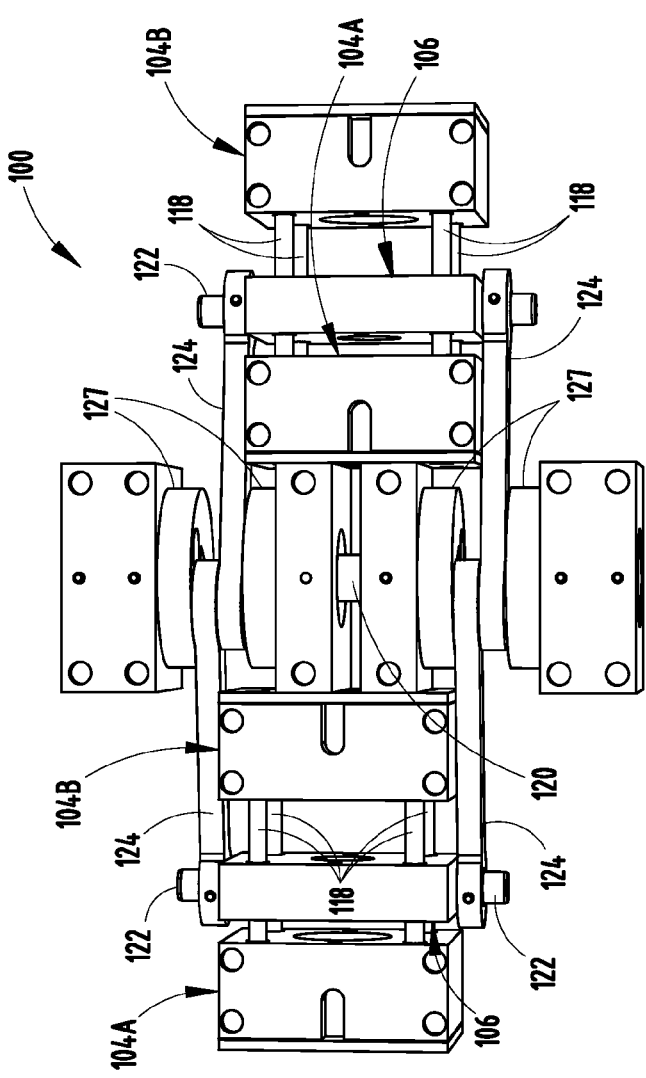
FIG. 17 is a top perspective view of a motor system, in accordance with one embodiment of the present invention.

As illustrated in FIGS. 18A and 18B, the electromagnet 108 can have a cylindrical shape, according to one embodiment. In such an embodiment, the electromagnet 108 can have an approximately one inch (1 in) hole in a center, have a first radi ($R_1$) of approximately two and sixty three hundredths inches (2.63 in), a second radi ($R_2$) of approximately three inches (3 in), a third radi ($R_3$) of approximately six inches (6 in), and a fourth radi ($R_4$) of approximately six and a half inches (6.5 in). Additionally, or alternatively, the electromagnet 108 can have a height (H) of approximately four inches (4 in).

According to one embodiment, as illustrated in FIG. 4, an aluminum block can be used to house a piston assembly 106, such that the piston housing assembly 114 is constructed in one or more pieces. Typically, each half of the piston assembly housing 114 has an approximately three inch (3 in) deep pocket bored in the middle section to approximately precisely fit the shape of the magnet 112. Tolerances can be small, such as, but not limited to, one-one thousandth of an inch (¹⁄₁₀₀₀ in) so that the magnet 112 has minimal movement, if any, within its pocket. These exemplary tolerances may be maintained throughout the motor system 100.

In an exemplary embodiment, wherein the piston assembly housing 114 is a one or multi-piece housing (FIGS. 1, 2, 4, and 5), there can also be two (2) connecting rod pins 122 in the middle, one on each side, to secure the connecting rod 124 to the piston assembly 106. The piston assembly housing 114 can have four (4) approximately one and a half inch (1½ in) horizontal holes 130 between the magnet pocket and vertical holes 128 near the corners on each side and below the magnet 112 pocket so as to accommodate the four approximate one inch (1 in) piston assembly support rods 118 with linear ball bearings and bushings (FIGS. 2 and 4). The embedded ball bearings allow the piston assembly 106 to slide back and forth between the first and second end assemblies 104A, 104B with reduced friction, as compared to if the ball bearings were not used. A six inch (6 in) bushing can also be included to increase strength.

Figure 8:
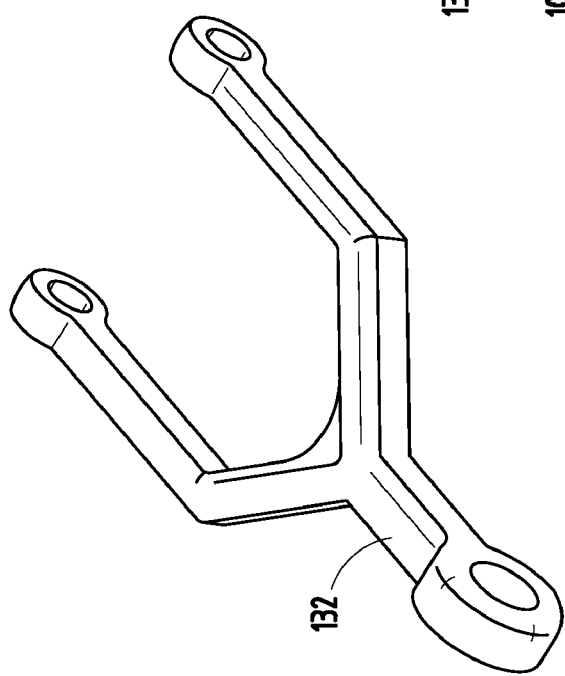
FIG. 8 is a top-side perspective view of a wishbone piston rod, in accordance with one embodiment of the present invention.

According to one embodiment, the connecting rod 124 can be made of aluminum. According to one embodiment, the connecting rod 124 can be a wishbone piston rod 132 (FIG. 8). The piston assembly housing 114 can be shaped like a rectangle with dimensions being approximately ten inches (10 in) long, five and nine-tenths inches (5⁹⁄₁₀ in) wide, and eight inches (8 in) thick. The magnet 112 can be approximately one-tenth inch (¹⁄₁₀ in) wider than the piston housing assembly 114 to allow it to protrude slightly from each side of the piston assembly housing 114.

According to one exemplary embodiment, as illustrated in FIG. 7, the end assembly 104 can include the electromagnet 108 surrounded by stainless steel, and cased in a two-piece aluminum block, which forms the end assembly housing 110. Similar to the piston assembly 106, the electromagnet 108 can be seated in a cut pocket within each half of a two-piece aluminum block that forms the end assembly housing 110. Once the electromagnet 108 is in place, an epoxy can be applied to the two halves of the block to secure the blocks forming the end assembly housing 110, and bolts can be used along each end, which also fastens the end assembly 104 to a piston unit base 140 that secures the end assembly 104 and piston assembly 106. The electromagnet 108 can protrude slightly from the side of the end assembly 104 that faces the piston assembly 106, and aligns with the magnet 112 of the piston assembly 106. According to one exemplary embodiment, as illustrated in FIG. 1, the end assembly housing 110 can be a one piece housing, wherein an end plate 142 is removably attached to the end assembly housing 110 to secure the electromagnet 108 in the end assembly housing 110. Additionally or alternatively, an epoxy, other suitable adhesive, or a combination thereof, can be used to secure the electromagnet 108.

Wires for the electromagnet 108 can exit a rear of the end assembly housing 110, according to one embodiment. The end assembly 104 can also provide connecting holes 136 for the four (4) piston assembly support rods 118, which are supported on steel bushings for added strength and durability (FIG. 7). Additionally or alternatively, the electromagnet 108 used in the end assembly 104 can have an approximately one inch by one-half inch (1 in×½ in) notches cut from each corner of the electromagnet 108. The electromagnets 108 can have stainless steel covers to direct the magnetic field out the nose (FIG. 6). The electromagnet 108 can operate on an approximately 24-volt DC energy storage device 102, and can be constructed so that it is capable of neutralizing and reversing its polarity. As such, it can be controlled by a three-position switch operated by a small computer, such as, but not limited to, the controller 116. In Position 1, the electromagnet 108 attracts, in Position 2, the electromagnet 108 is neutral, and in Position 3, the electromagnet 108 repels.

According to one embodiment, the energy storage device can supply an electrical current of approximately seventeen amps (17A) to power the electromagnets 108. An alternating-current (AC) generator 158 can in turn operate the electrical motor system 100 as a function of the movement of the piston assembly 106 between the first and second end assemblies 104A, 104B, according to one embodiment. It should be appreciated by those skilled in the art that other suitable types of generators 158 can be used in the motor system 100. The attraction/repelling of the magnet 112 can be a substitute for a force generated by an explosion of fossil fuel in an internal combustion engine. Manipulation of the polarity of the electromagnets 108 at a predetermined distance (e.g., TDC and BDC) can cause the magnet 112 to simultaneously attract and repel. This dual action can be created by the electromagnets 108 sequentially altering the polarity of these magnetic fields. Typically, the electromagnets 108 are placed so that their field lines are substantially aligned with a respective field line on each end of the magnet 112. Such an alignment can increase efficiency of fields, thereby increasing power and stabilizing a path of the piston assembly 106.

Typically, when the electromagnet 108 is set to repel, the electromagnet 108 renders the end assembly 104 non-magnetic, and only produces a relatively small repelling power as opposed to the power exerted when the electromagnet 108 is set to attract. Thus, the repelling action allows the piston assembly 106 to freely reciprocate. The magnetic field can emanate from an approximately three inch (3 in) surface in the middle of the end assembly 104 that protrudes slightly (e.g., approximately five-hundredths of an inch (1/20 in)) from the end assembly housing 110 and facing the piston assembly 106. The surface can align exactly with the exposed surface of the magnet 112 of the piston assembly 106, which slides towards each end assembly 104 on the support rods 118.

According to one embodiment, the strength of the electromagnets 108 magnetic fields can be balanced, such that one magnetic field does not overpower the other magnetic field, thereby allowing the manipulation of the magnetic fields. Thus, the negative magnetic field can be strong enough to render its core non-magnetic by creating a sufficient demagnetizing field, and to stop and repel the piston assembly 106 by creating an elastic collision. Typically, the end assembly housing 110 and the piston assembly housing 114 are made of one or more materials that do not substantially affect the magnetic fields.

Figure 9:
FIG. 9 is a side view of a base of a piston assembly, in accordance with one embodiment of the present invention.

An aluminum block can be used to create the end assembly housing 110, which can be approximately six inches by eight inches by ten inches (6 in×8 in×10 in). Additionally or alternatively, the end assembly housing 110 can be constructed of two (2) identical halves, which are therefore interchangeable (FIG. 7), wherein each half (bottom and top) of the end assembly housing 110 can have a pocket bored into it to precisely fit the shape of the electromagnet 108 to hold it securely. In such an embodiment, each half can also have six (6) holes 138 drilled vertically, three holes near each end, to accommodate bolts that hold the two halves together and to secure the end assembly 110 to the piston unit base 140 (FIGS. 7 and 9).

Also, each half can have two approximately one and one-half inch (1½ in) horizontal holes between the electromagnet pocket and the vertical holes 138 near the ends, on each side of and below the electromagnet pocket, so as to accommodate the four approximately one inch (1 in) support rods 118 and bushings. The end assembly 104 can be constructed with a liquid-cooled jacket in the event the electromagnet 108 generates too much heat. A pump for the water jacket would be operated by a camshaft, as discussed in greater detail below.

According to one embodiment, the support rod 118 is used to suspend and provide a glide path for the piston assembly 106 as it moves back and forth between the first and second end assemblies 104A, 104B. Typically, four (4) such support rods 118 can be used, which can remove the need for a cylinder or wall to contain and direct the movement of the piston assembly 106. For purposes of explanation and not limitation, the support rods 118 can have an approximately one inch (1 in) diameter, and can be approximately thirty inches (30 in) long, and constructed of heat-treated and ground tool steel, such as, but not limited, to stainless steel, titanium, other suitable non-magnetic material, or a combination thereof. As stated above, sealed linear stainless steel ball bearings can be embedded in the piston assembly 106 and in the holes 130 for the support rods 118 (FIG. 7).

The support rods 118 can pass through the first and second end assemblies 104A, 104B and the holes 130 for the support rods 118. Additionally or alternatively, these rods can eventually anchor into the motor block assembly on a crankcase on the side of the motor system 100. On the opposite side, the support rod 118 is attached to the piston unit base 140 or to a second motor block assembly if more than one crankcase is used. The support rod 118 can be supported on bushings inside the holes 130 for the support rod 118 in both the piston assembly 106 and the end assembly 104 in order to strengthen the piston assembly housing 114 and the end assembly housing 110, respectively. By way of explanation and not limitation, the piston assembly housing 114 can be at least partially made of aluminum, suitable non-metallic material, the like, or a combination thereof.

According to one embodiment, the wishbone piston rod 132 can be used rather than two (2) connecting rods 124, to provide smooth transmission of the movement of the piston assembly 106 to the crankshaft 120 without interfering with the magnetic fields produced by the electromagnets 108 and the magnet 112 of the piston assembly 106 (FIG. 8). In an embodiment that includes the wishbone piston rod 132, the wishbone piston rod 132 can be constructed of, but not limited to, stainless steel, titanium, other suitable non-magnetic alloys, or a combination thereof. Due to the amount of torque generated by the piston assembly 106, the connecting rod 124 or the wishbone piston rod 132, and the crankshaft 120 can be made to withstand the forces applied thereto. Typically, the wishbone piston rod 132 can be connected to each side of the piston assembly 106 by the connecting rod pins 122 using small thrust bearings. The end of the wishbone piston rod 132 can be connected to the crankshaft 120 using a rod cap.

In an embodiment that utilizes two (2) connecting rods 124 per piston assembly 106, the piston assemblies 106 on opposite sides of the crankshaft 120 and crankshaft support housing 126 (e.g., a two-cylinder motor system 100) can be offset from one another by approximately a width of the connecting rod 124. A flywheel can be connected to the crankshaft 120 to provide smooth rotation and added torque, according to one embodiment.

Figure 11:
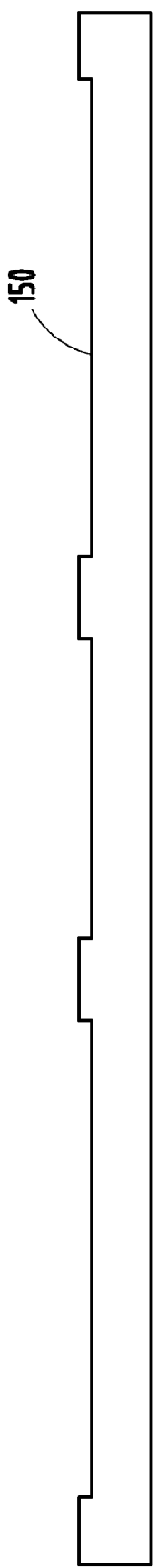
FIG. 11 is a side view of a mounting plate, in accordance with one embodiment of the present invention.

The end assemblies 104 can be bolted to an approximately two inch (2 in) thick non-magnetic bottom plate, which forms a base unit for an entire motor system 100, according to one embodiment. Additionally or alternatively, the piston unit base 140 can be designed to abut the motor block assembly, and both can fasten on top of the mounting plate 150. All are constructed to interlock to provide overall strength and unity of the combined motor components. The piston unit base 140 uses a keyhole to help secure it to the mounting plate 150 (FIG. 11). Typically, the primary components described above are assembled to create one piston assembly 106. Once assembled, each piston assembly 106 and corresponding first and second end assemblies 104A, 104B is an independent single piston motor ready to transmit movement to a crankshaft 120. Typically, twelve (12) such units are combined to produce virtually seamless torque to supply mechanical power or work for an application. It should be appreciated that any number of piston assemblies 106 and corresponding first and second end assemblies 104A, 104B can be combined to alter the power or work output of the motor system 100. The motor system 100 can be constructed of two end assemblies 104A, 104B, a piston assembly 106, four (4) piston assembly support rods 118, the wishbone piston rod 132 or two (2) connecting rods 124, a crankshaft 120, and a mounting plate 150.

Figure 10:
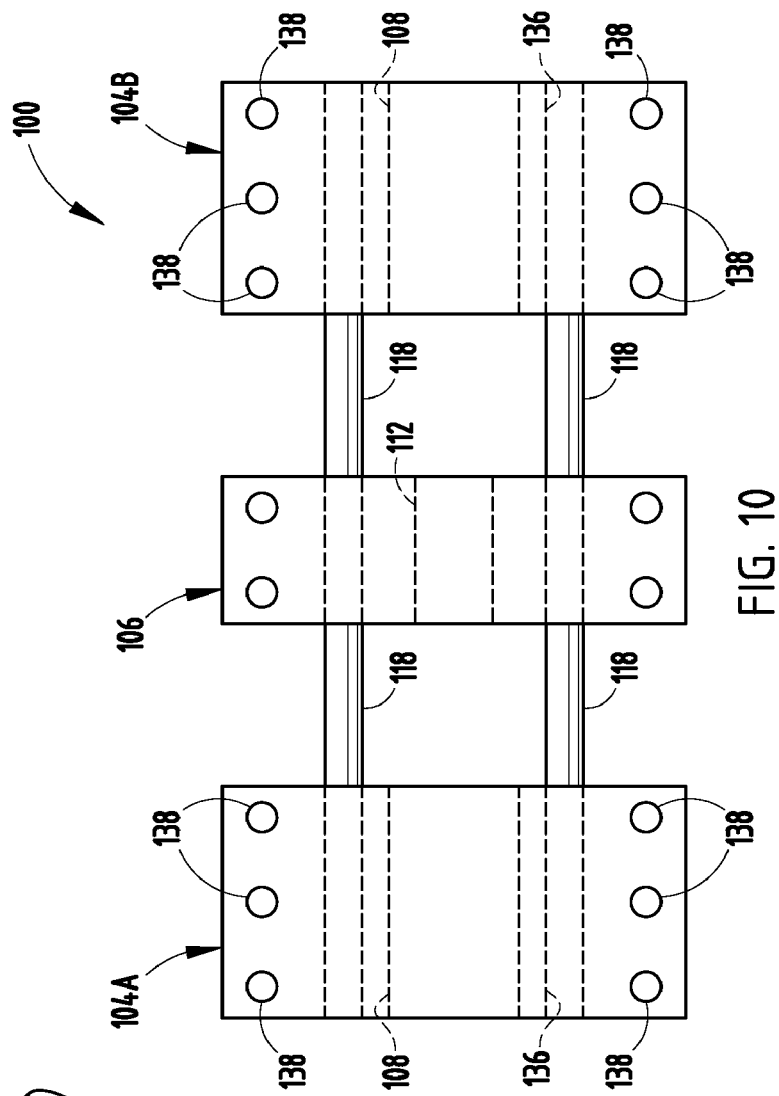
FIG. 10 is a top view of a piston assembly, in accordance with one embodiment of the present invention.

According to one embodiment, the end assemblies 104 can be bolted to the piston unit base 140 (FIG. 9). The piston assembly support rods 118 can be inserted through the piston assembly 106 and the end assemblies 104 (FIG. 10). Additionally or alternatively, the piston assembly support rods 118 can be inserted into the motor block assembly on the end of the piston assembly that faces the crankcase. The wishbone piston rod 132 can be operably connected to the piston assembly 106 using connecting rod pins 122 extending from the piston assembly housing 114. The other end of the wishbone piston rod 132 can be operably connected to the crankshaft 120 with a rod cap to convert the linear motion to rotary.

Typically, twelve (12) piston units are used, so that the crankshaft 120 will have twelve (12) journals equally spaced to complete a three hundred sixty degree (360°) rotation. It can be constructed of a strong non-metallic alloy (e.g., titanium), and can extend outside a motor block assembly approximately six inches (6 in). It can also contain a gear used to operate the camshaft. The camshaft can be constructed with a worm gear at one end and a gear or sprocket at the other end. The gear on the crankshaft 120 and the gear on the camshaft can be identical, and suitable to turn the camshaft at the same speed as the crankshaft 120. A distributor is gear-driven by the camshaft to turn one-to-one (1:1) with it, and therefore, the crankshaft 120. It can signal the controller 116, which is programmed to control the polarities switching the electromagnets 108.

According to one embodiment, the motor block assembly can be constructed of two pieces of aluminum, a top half, and a bottom half, approximately twelve inches (12 in) wide by twelve inches (12 in) tall. Six inches (6 in) up from the bottom is an approximately three inch (3 in) hole passing completely through the block assembly that is machined to provide clearance for the crankshaft 120, and support the main cap for the bearings. The crankshaft 120 can be in an oil bath. Approximately six inches (6 in) up from the center of the crankshaft 120 is an approximately three inch (3 in) hole that is approximately fourteen inches (14 in) deep to locate the camshaft. Bushings can be inserted to strengthen these areas. The top half of the motor block assembly can be bolted down to the bottom half with long threaded studs extending from the top to accommodate nuts.

The mounting plate 150 can be large enough to support the piston assembly 106 and the motor block assembly, and when included in an embodiment of the motor system 100, can be constructed of aluminum. Additionally or alternatively, the mounting plate 150 can contain keyhole indentations to accommodate light protrusions from the bottom of the piston unit base 140 and motor block assembly. It also contains studs used to fasten down the piston unit base 140 and the motor block assembly (FIG. 11).

The electromagnets 108 can have liquid circulating jackets, which can circulate water by a water pump, according to one embodiment. Additionally or alternatively, an oil pump can be used to circulate oil through rod bearings and the main bearings.

The generator 158 can be used to provide electrical power to operate the electrical magnets 108 and the controller 116. Additionally or alternatively, the generator 158 can also be used to recharge the energy storage device 102, an additional energy storage device 160, or a combination thereof, that will be used to either operate the motor or to energize a starter. By way of explanation and not limitation, the generator 158 can be, but is not limited to, a one hundred ten volt alternating current (110 VAC), ten kilovolt amps (10 kVA) generator.

According to one embodiment, twelve (12) piston assemblies 106 and corresponding first and second end assemblies 104A, 104B are connected to the mounting plate 150, wherein six (6) piston assemblies 106 and corresponding first and second end assemblies 104A, 104B are on either side of the motor block assembly, which can also connected to the mounting plate 150 (FIG. 11). Leads 162 from the electromagnets 108 electrically connect to the controller 116 that is programmed (e.g., one or more executable software routine, suitable electronic circuitry, or a combination thereof) to control the change of polarity of each electromagnet 108 within the motor system 100. According to an alternate embodiment, the timing of the changing of the polarity can be controlled by a distributor 164, which receives its timing from the camshaft that is connected to the crankshaft 120 by using the two identical gears.

The electromagnets 108 can operate on twenty-four volt direct current (24 VDC) that will come from the at least one energy storage devices 102 or from the generator 158. In such an embodiment, the motor system 100 completely self-contained without the need for any outside energy source to operate. One exposed end of the crankshaft 120 can be connected to a transducer, while the other exposed end is available, such that the motor system 100 is operably connected to a large electric generator 166 or transmission motor 168 depending upon an applied application.

According to one embodiment, the piston assembly 106 and corresponding first and second end assemblies 104A, 104B, the motor block assembly, when included in an embodiment of the motor system 100, and the mounting plate 150 are encased in an air tight plastic shell containing a filtered air vent to prevent airborne contamination within the motor system 100. In the alternative, the shell can be made of non-magnet material to shield the environment from the magnetic fields from the piston assembly 106 if necessary for the application.

The RPMs of the motor system 100 can be from approximately sixty (60) to two hundred forty (240), depending upon the desired horsepower and/or torque, according to one embodiment. Additionally, the size of the motor system 100 can be made as big as necessary to accommodate the largest magnets to produce a desired amount of power or can be reduce to accommodate smaller size of power requirements. Alternatively, the wishbone piston rod 132 can be a double wishbone capable of operating the crankshaft 120 on both ends of the piston assembly 106, which can allow the motor system 100 to operate three (3) crankshafts 120 instead of just one (1) crankshaft 120. Yet another alternative would be to remove the support rods 118 and installing a magnetic sleeve between the first and second end assemblies 104A, 104B. The piston assembly 106 would be replaced by a one-piece rare Earth magnet of opposite polarity from the sleeve allowing the piston to float on the magnet field within the sleeve.

Figure 13:
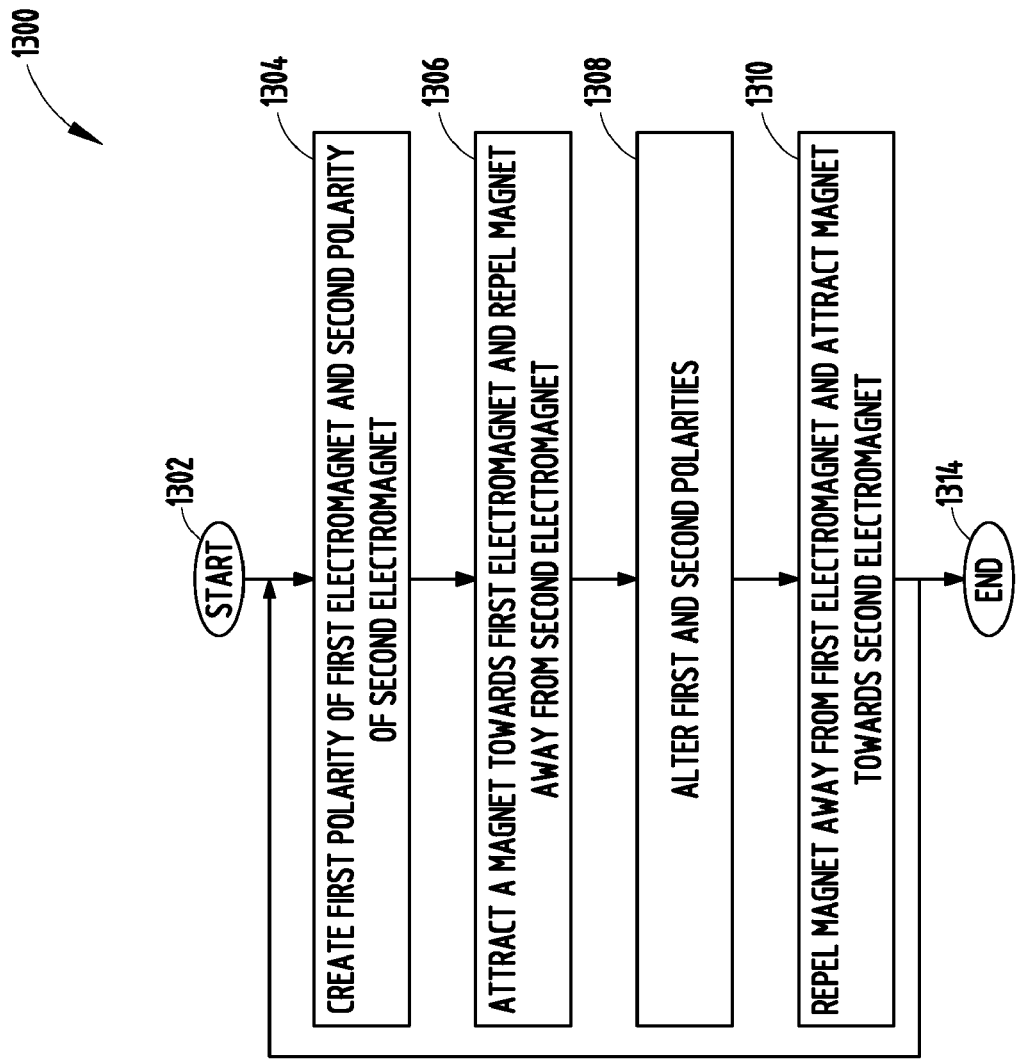
FIG. 13 is a flow chart of a method of producing work as an output, in accordance with one embodiment of the present invention.

In regards to FIGS. 1, 13 and 15, a method for producing work as an output is generally shown in FIG. 13 at reference identifier 1300. The method 1300 starts at step 1302, and proceeds to step 1304, wherein a first polarity of the first electromagnet 108 and a second polarity of the second electromagnet 108 is created. At step 1306, the magnet 112 is attracted towards the first electromagnet 108, and the magnet 112 is repelled away from the second electromagnet 108. The first and second polarities are altered at step 1308. At step 1310, the magnet 112 is repelled away from the first electromagnet 108, and the magnet 112 is attracted towards the second electromagnet 108, and the method 1300 then ends at step 1312.

Figure 14:
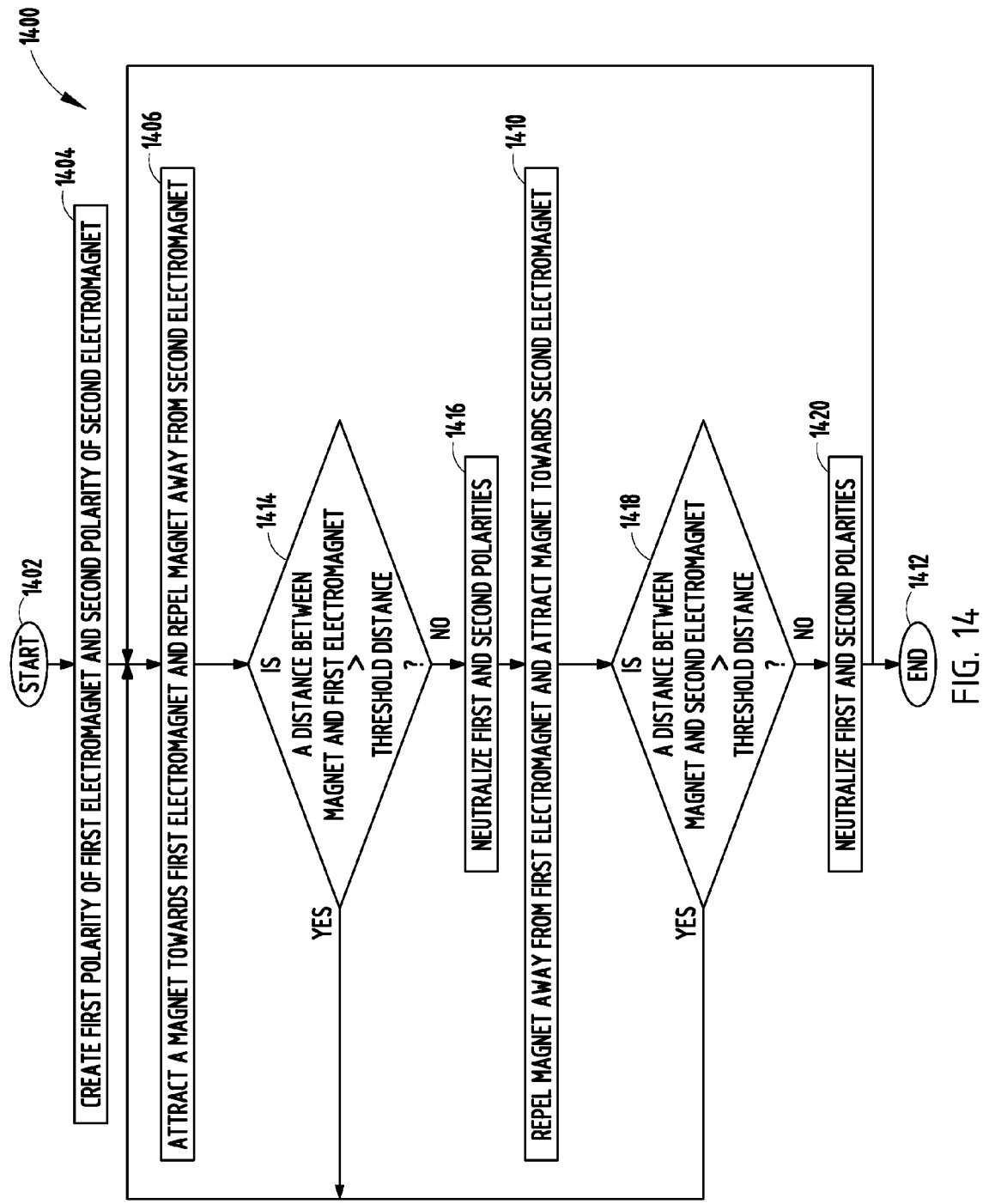
FIG. 14 is a flow chart of a method of producing work as an output, in accordance with another embodiment of the present invention.

With respect to FIGS. 1, 14, and 15, a method for producing work as an output is generally shown in FIG. 14 at reference identifier 1400. The method 1400 starts at step 1402, and proceeds to step 1404, wherein a first polarity of the first electromagnet 108 and a second polarity of the second electromagnet 108 is created. At step 1406, the magnet 112 of the piston assembly 106 is attracted towards the first electromagnet 108 of the first end assembly 104, and the magnet 112 of the piston assembly 106 is repelled away from the second electromagnet 108 of the second end assembly 104.

At decision step 1414, it is determined if a distance between the magnet 112 and the first electromagnet 108 is greater than a threshold distance. If it is determined at decision step 1414 that the distance between the magnet 112 and the first electromagnet 108 of the first end assembly 104 is greater than a threshold distance, then the method 1400 returns to step 1406. However, if it is determined at decision step 1414 that the distance between the magnet 112 of the piston assembly 106 and the first electromagnet 108 of the first end assembly 104 is not greater than a threshold distance, then the method 1400 proceeds to step 1416.

At step 1416, the first and second polarities are neutralized. Typically, the controller 116 can be configured to control the supply of electrical power from the energy storage device 102 to the electromagnets 108 of the first and second end assemblies 104A, 104B to neutralize the polarities of the electromagnets 108. At step 1410, the magnet 112 of the piston assembly 106 is repelled away from the first electromagnet 108 and the magnet 112 of the piston assembly 106 is attracted towards the second electromagnet 108 of the second end assembly 104. Typically, the controller 116 controls the supply of electrical power from the electrical storage device 102 to the first and second electromagnets 108 of the first and second end assemblies 104 to alter the polarities of the first and second electromagnets 108.

At decision step 1418, it is determined if a distance between the magnet 112 of the piston assembly 106 and the second electromagnet 108 of the second end assembly 104 is greater than a threshold distance. If it is determined at decision step 1418 that a distance between the magnet 112 of the piston assembly 106 and the second electromagnet 108 of the second end assembly 104 is greater than a threshold distance, then the method 1400 returns to step 1410. However, if it determined at decision step 1418 that the distance between the magnet 112 of the piston assembly 106 and the second electromagnet 108 of the second end assembly 104 is not greater than a threshold distance, then the method 1400 proceeds to step 1420. At step 1420, the first and second polarities are neutralized. The method 1400 can then return to step 1406, and the method 1400 ends at step 1412. It should be appreciated by those skilled in the art that the neutralization of steps 1416 and 1420, and the polarizations of the electromagnets 108 at step 1406 and 1410, can include the time delay with respect to the creation of the magnetic fields, as set forth above.

Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. A motor system comprising:
    an energy storage device;
    a piston assembly comprising:
        a neodymium magnet; and
        a piston assembly housing enclosing at least a portion of said neodymium magnet;
    at least two end assemblies, wherein said piston assembly is configured to move with respect to said at least two end assemblies, said at least two end assemblies comprising:
        a first end assembly; and
        a second end assembly on an opposite side of said piston assembly of said first end assembly, each of said first and second end assemblies comprising:
            an electromagnet in electrical communication with said energy storage device; and
            an end assembly housing enclosing at least a portion of said electromagnet;
    at least one support rod extending between and connecting said first end assembly and said second end assembly, wherein said at least one support rod extends through said piston assembly;
    a crankshaft operably connected with said piston assembly;
    a connecting rod extending from said piston assembly housing and operably connected to said crankshaft;
    a crankshaft connector, wherein said crankshaft connector is operably connected to said crankshaft and said connecting rod to operably connect said crankshaft to said piston assembly; and
    a controller in electrical communication with said energy storage device and said at least two end assemblies, wherein said controller is configured to control a supply of electrical power to said first and second electromagnets of said first and second end assemblies, such that a first polarity of said first electromagnet is opposite a second polarity of said second electromagnet, and said first and second polarities are intermittingly altered by said supply of electrical power, so said magnet of said piston assembly is attracted and repelled from said first and second end assemblies.

2. The system of claim 1, wherein said magnet of said piston assembly has the same polarity on a first end that is directed towards said first electromagnet of said first end assembly and a second end that is directed towards said second electromagnet of said second end assembly.

3. The system of claim 1, wherein as said piston assembly is attracted and repelled by said first and second end assemblies, said piston assembly's directional movement is a function of a shape of said at least one support rod.

4. The system of claim 1, wherein a rotational movement of said crankshaft is a function of movement of said piston assembly as said piston assembly is being attracted and repelled between said first and second end assemblies.

5. The system of claim 1, wherein said connecting rod is a wishbone connecting rod.

6. The system of claim 1, wherein said controller is configured to control said supply of said electrical power from said energy storage device to said first electromagnet to attract said magnet of said piston assembly, alter said electrical power supplied to said first electromagnet when said piston assembly is a predetermined distance away from said first end assembly, such that said first polarity is neutralized, and alter said electrical power supplied to said first electromagnet to repel said piston assembly.

* * * * *